No. 816,663.
PATENTED APR. 3, 1906.
W. G. JOBLING.
REVERSIBLE DISK PLOW.
APPLICATION FILED APR. 15, 1905.
3 SHEETS—SHEET 1.
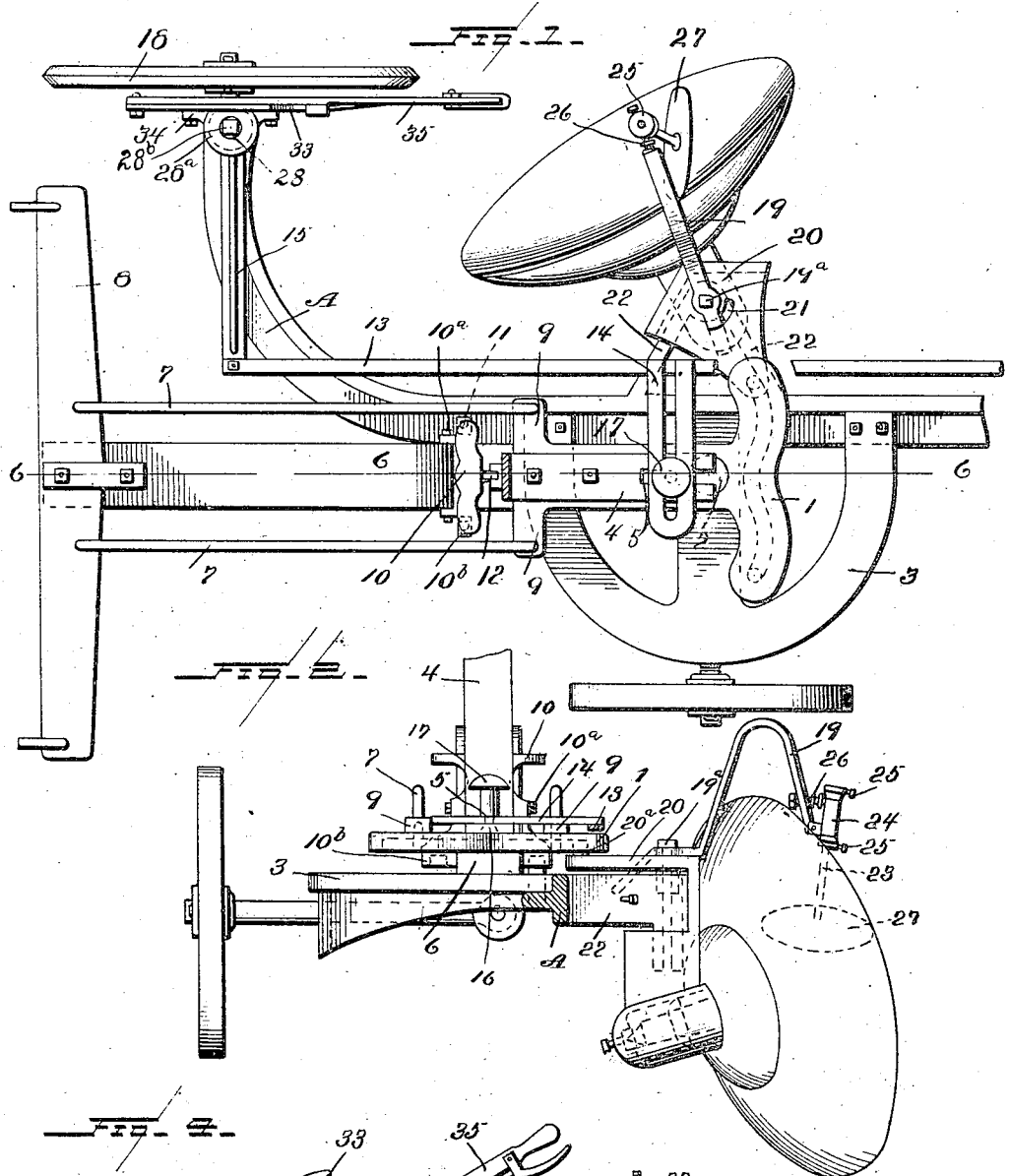

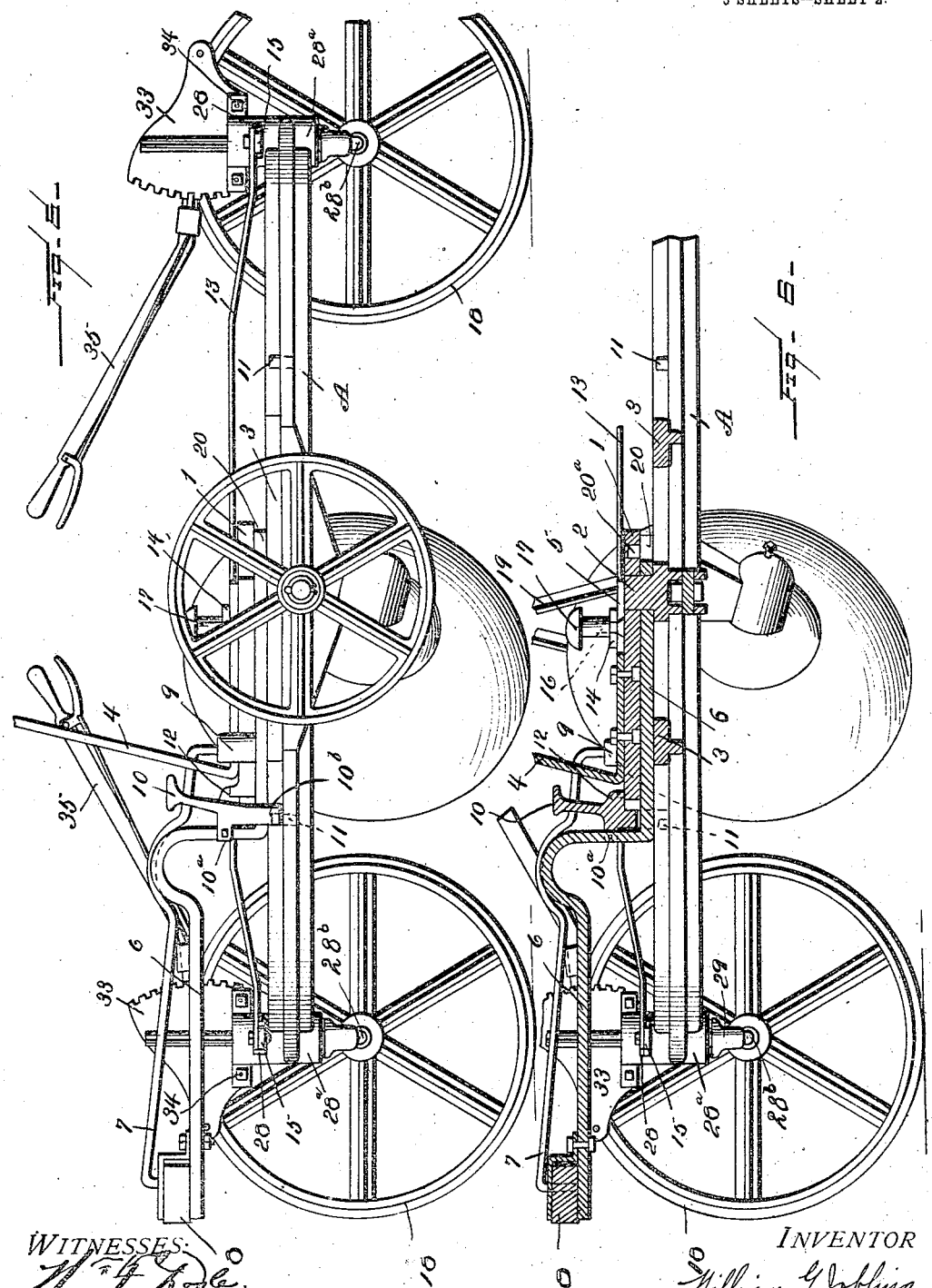

No. 816,663. PATENTED APR. 3, 1906.
W. G. JOBLING.
REVERSIBLE DISK PLOW.
APPLICATION FILED APR. 15, 1905.
3 SHEETS—SHEET 3.
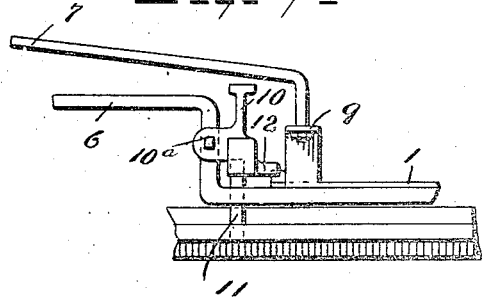
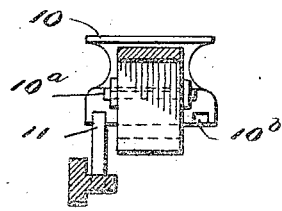
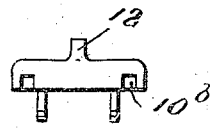
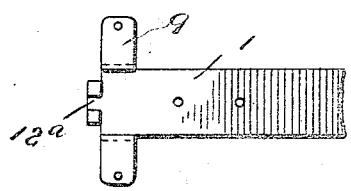
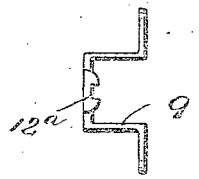
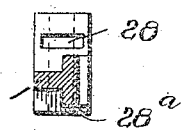
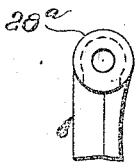
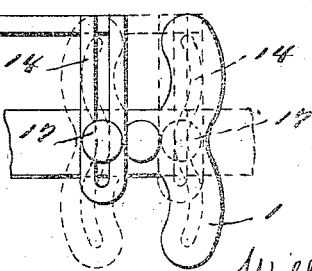
INVENTOR
William G. Jobling
BY
Milo B. Stevens & Co
Attorneys
WITNESSES:

UNITED STATES PATENT OFFICE.

WILLIAM G. JOBLING, OF RIDGEDALE, TENNESSEE.

REVERSIBLE DISK PLOW.

No. 816,663.  Specification of Letters Patent.  Patented April 3, 1906.

Application filed April 15, 1905. Serial No. 255,708.

*To all whom it may concern:*

Be it known that I, WILLIAM G. JOBLING, a citizen of the United States, residing at Ridgedale, in the county of Hamilton and State of Tennessee, have invented new and useful Improvements in Reversible Disk Plows, of which the following is a specification.

This invention relates to reversible disk plows, particularly to that kind of a plow shown in my Patent No. 769,167, being a plow which is reversed by swinging the draft-animals and the tongue around without turning the frame of the plow.

The present invention relates especially to the means for turning or reversing the disk, for regulating the line of draft of the furrow-wheels, and for adjusting the same to proper height. A novel form of scraper is also shown.

The plow is illustrated in the accompanying drawings, in which—

Figure 1 is a plan view of the same, partly broken away. Fig. 2 is a rear elevation of the parts shown in Fig. 1. Fig. 3 is a detail showing the manner of mounting the furrow-wheel axles. Fig. 4 is a detail in elevation showing the lever adjustment to the furrow-wheel axles. Fig. 5 is a side elevation of the complete plow. Fig. 6 is a section on the line 6 6 of Fig. 1. Fig. 7 is a detail in side elevation of the foot-latch and associated parts. Fig. 8 is a front view of the same parts. Fig. 9 is a bottom view of the latch. Figs. 10 and 11 are top and end views of the front end of the cam. Fig. 12 is a detail sectional plan showing parts of the reversing-gear. Figs. 13 and 14 are details of the hub for the furrow-wheel.

The plow is of the three-wheel type, having two furrow and one land wheels, the furrow-wheels being carried at the end of a curved main beam A, the tongue being pivoted at the middle of the beam to the center of a semicircular casting which is secured to one side of the beam. The disk is carried upon a wedge-shaped abutment secured to the other side of the beam. Pivotally mounted upon the semicircular casting is a reversing-cam having operative connection with the disk support or holder and acting to reverse the disk when the tongue is swung around.

Referring specifically to the drawings, 1 indicates the reversing-cam referred to. This is pivoted upon a boss 2 at the center of the half-circle casting 3. The cam-piece 1 rests upon the rear end of the tongue 6, which in turn is pivoted to the boss 2 and rests upon the casting 3. The cam-piece 1 rests upon the tongue, but is independent thereof, to the extent that it is not attached thereto permanently, although connections are provided, so that the cam-piece will turn when the tongue is turned. At its forward end the cam-casting 1 has laterally-extending arms 9, which are connected by rods 7 to the whiffletree 8. This gives a connection between the cam-piece and the whiffletree independent of the tongue, so that when the team is turned the casting follows and the disk is reversed. Naturally the tongue will swing at the same time; but the motion is not necessarily produced by the swing of the tongue. The seat-standard 4 is bolted upon the cam-piece 1.

To lock the tongue and cam-piece together and to hold the tongue secure to the frame or beam, a foot-latch 10 is employed. This is pivoted to the tongue at 10$^a$ and has at each side depending wings or projections containing notches 10$^b$, which are arranged to respectively engage over or around one of the pins 11, projecting from the beam on opposite sides of the central half-circle. A pin or stud 12 also projects backwardly at the middle of the foot-latch and engages in a slot 12$^a$ at the front end of the cam-piece 1. When the latch is engaged with one of the pins 11 and the stud 12 is engaged in the slot in the front end of the cam-piece 1, said pieces are all locked together in position to plow.

When it is desired to release or reverse the plow, the foot-latch 10 is kicked forwardly, swinging its lower end out of contact with the pin 11 and also lifting the catch 12 from the slot in the end of the cam-casting 1. Then the team and tongue may be swung around on the central pivot 2, the connections 7 acting to carry the cam-plate around quite independent of the tongue. However, the foot-latch 10 releases the pin 11 before the catch 12 leaves the slot in the front end of the cam-casting, so that the tongue will turn the cam, if it be desired, but by kicking the foot-latch clear forward the rods act to reverse the cam. Both the cam-casting and the tongue turn on the boss 2 when reversing.

In the rear end of the foot of the seat-standard 4 is an undercut slot 5, which receives the beveled head of a bolt 16, which works in said slot. The bolt is secured in adjusted position by a knob 17, which can be operated from the seat, if necessary, to adjust or move the bolt. The equalizing-bar 13 has at the middle a loop 14 and is connected at its ends to arms 15, which are secured to the furrow-wheel axles. The loop 14 overlaps the slot 5, and the bolt 16 extends up through the slot and through the loop and is put in proper position by the knob 17. To vary the lead or angle of the furrow-wheels, the bolt may be moved back and forth in the slot 5 by means of the knob, carrying with it the loop 14, and thereby dragging one way or the other the bar 13, and so changes the lead of the furrow-wheels 18 and holds them in proper position. The loop 14 and the bolt and knob 16 and 17, which lie to one side of the pivot 2 when the plow is turned one way, will lie at the other side when the tongue and cam are reversed at the end of a row. Thus in Fig. 1 said parts are to the left of the pivot. When the plow is reversed, they will be shifted to the right of the pivot, thereby shifting the bar 13 and the wheels.

A scraper-standard 19 is fastened by a bolt 19ᵃ at the center or pivot-point of the hollow casting 20, which forms the standard or support for the disk-holder, in substantially the same manner as shown in my former patent, hereinbefore referred to. The inner end of the arm 19 passes through a slot 21 in the casting 20 and depends between the arms 22 of the wedge-shaped lug or abutment upon which the casting 20 swings, and when the casting and disk are reversed the inner depending end of the arm 19 is carried around by the end of the slot 21 until said end strikes the inner surface of the part 22, thereby holding said scraper-arm rigid and in proper position.

At its outer end the scraper-arm 19 has hinged thereto a sleeve-casting 24, through which extends a rod 23, to which the scraper 27 is fastened. Collars 25, at opposite ends of the sleeve, are fastened, by means of set-screws, upon the arm 23, permitting a longitudinal adjustment to said rod, with consequent movement of the scraper and also allowing the rod to swivel at all times, so that when the disk is reversed the scraper 27 will adjust itself to the disk. The spring 26, extending between the arm 19 and the sleeve 24, tends to throw the scraper 27 inwardly and to give proper pressure on the face of the disk.

The hubs 28ᵃ at the ends of the main beam A of the plow have cored recesses 28 to allow the arms 15 to swing the furrow-wheel axles 28ᵇ, to which said arms are connected, the axles being nevertheless movable vertically through the arms and hubs. A collar 29 fits over the vertical arm of the axle 28ᵇ and is seated at the elbow of the axle, where it is secured by a U-bolt 31. The notched segment 33 is bolted to lugs 34 at the top of the hub 28ᵃ, and the lever 35 is connected by a strip 32 to a lug 30 on said collar 29. The operation of the lever raises and lowers the furrow-wheels in an obvious manner. The axle 28ᵇ slides vertically through the arm 15 and the hub, but turns when the arm is swung.

A pin 20ᵃ on the rear end of the casting 20 extends into the cam-groove at the rear end of the cam-piece 1, and when the cam-piece is swung around said pin moves along in the groove and swings the disk around, reversing the same, so that it is presented in the opposite direction. At the same time the scraper is reversed in the manner above indicated. It will be understood that before the tongue can be swung around the latch 10 must be disengaged from one of the pins 11, and when fully reversed the latch engages the pin on the other side, thereby locking and holding the parts until again reversed. The plow may thus be worked back and forth across the field without turning the plow-frame, throwing the furrow in the same direction in both ways.

What I claim as new, and desire to secure by Letters Patent, is—

1. In a reversible disk plow having furrow-wheels at both ends of the plow-beam, the combination with a reversing cam-piece having an operative connection to the plow, of an equalizing-bar having arms connected to the furrow-wheels to vary the lead thereof, and an adjustable bolt and slotted piece connecting the cam-piece and the said bar, to shift the latter when the plow is reversed.

2. In a reversible disk plow, the combination with a frame and a reversible disk thereon, of a tongue pivoted upon the frame, a whiffletree on the tongue, a reversing cam-piece pivoted on the frame and connected to the disk, and connections between the whiffletree and the cam-piece, independent of the tongue, for operating the same.

3. In a reversible disk plow, in combination, a frame, a reversible disk thereon, a tongue pivoted on the frame, a reversing cam-piece pivoted on the frame and having a connection with the disk to reverse the same, a whiffletree on the tongue, and connections between said whiffletree and the reversing cam-piece.

4. In a reversible disk plow, the combination with the frame and the reversible disk thereon, of a reversing-piece pivoted on the frame and connected to the disk, a tongue pivoted on the frame, and a latch between the tongue and said piece.

5. In a reversible disk plow, the combination with the frame and the reversible disk thereon, of a tongue on the frame, a cam-piece pivoted on the frame and having at one end a connection with the disk to reverse the same and at the other end a detachable engagement with the tongue.

6. In a reversible disk plow, the combination with a frame having a wedge-shaped abutment thereon formed of two spaced arms which meet at the point, of a plow-support pivoted on said abutment and having a slot therein, and a scraper-standard also pivoted on said abutment and having its inner end projecting through said slot between the arms and arranged to strike the same to reverse the scraper.

7. The combination with a disk plow, of a scraper-arm supported on the frame of the plow and overhanging the disk, a sleeve hinged to the outer end of the arm, and a rod rotatable in said sleeve and carrying a scraper-blade in contact with the disk.

8. In a reversible plow, the combination with furrow-wheels having turning-axles at the ends of the plow-beam, of an equalizing-bar connected to said axles and having an extension, a disk-reversing element pivoted on the plow-frame, and a slot-and-bolt connection between said element and said extension.

In testimony whereof I have signed my name to this specification in the presence of two subscribing witnesses.

W. G. JOBLING.

Witnesses:
  R. P. BASS,
  JAS. PYNE.